Aug. 2, 1932.  W. E. WILLIAMS  1,870,157
CORNER FASTENING MEANS
Filed July 28, 1930
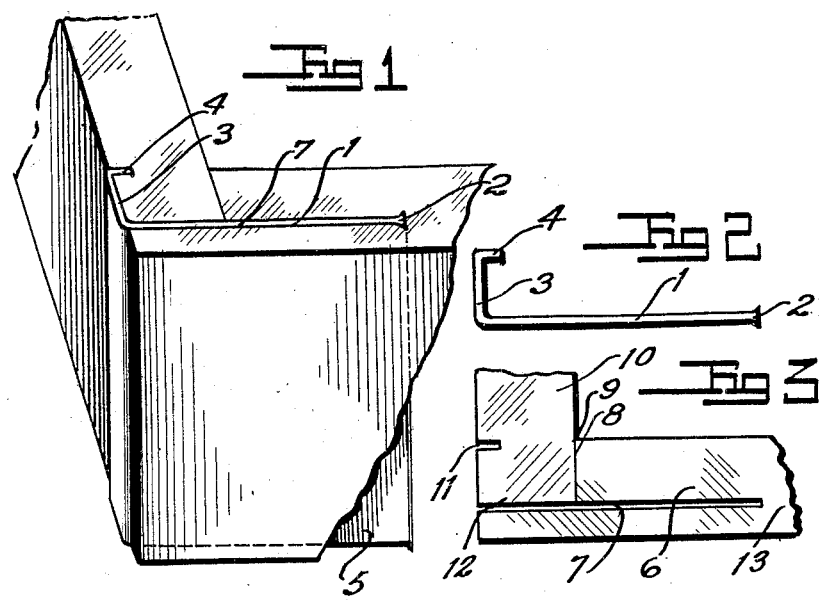
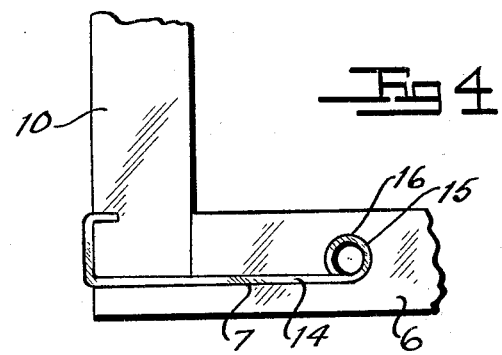
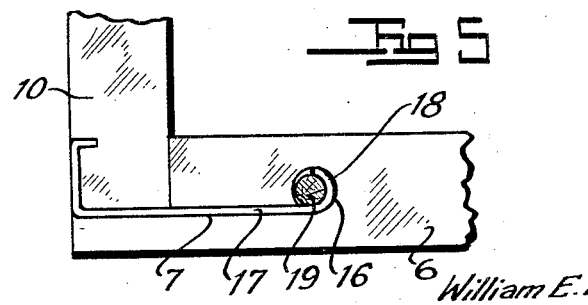
INVENTOR.
William E. Williams
BY
B. F. Frink
ATTORNEY.

Patented Aug. 2, 1932

1,870,157

UNITED STATES PATENT OFFICE

WILLIAM E. WILLIAMS, OF HARRISONVILLE, MISSOURI, ASSIGNOR OF ONE-HALF TO DELBERT T. HULSE, OF DE QUEEN, ARKANSAS

CORNER FASTENING MEANS

Application filed July 28, 1930. Serial No. 471,394.

This invention relates to corner fasteners for securing the corners of boxes, crates, furniture and the like without the use of nails, screws or glue and the invention contemplates a corner fastener which can be easily fastened to two members to in turn hold them rigidly together.

The invention will be understood by reference to the following description in connection with the accompanying drawing in which:

Fig. 1 is a perspective view of a corner fastening device constructed in accordance with my invention and applied.

Fig. 2 is an end view of the fastening device.

Fig. 3 is an edge view showing the saw cuts of two members to be fastened together.

Fig. 4 is an end view of a corner showing a modified form of my invention and

Fig. 5 is a similar view of a further modified form of the invention.

The corner fastening device shown in Figures 1 and 2 is shown as consisting of a plate 1 having a head 2 at one end and a hook at the other. The hook is shown as including a laterally bent portion 3 with an inbent lip 4. The lower edge 5 of the plate is preferably sharpened although it is not necessarily sharp for all purposes. When the device shown in Figures 1 and 2 is used, one member, either the end or side indicated at 6, is provided with a longitudinal, vertical saw cut 7 to provide a kerf. Part of the member 6 is cut away on one side of the kerf to provide a shortened end 8 against which the face 9 of the other member may abut. The second member 10 is provided with a saw cut or kerf 11 in its outer face.

The end 12 of the member 10 lies flush with the edge of the slot 7 formed by the portion 13 of member 6. The kerf or saw cut 11 will be the same distance from the end 12 as the lip 4 is from the plate 1. Therefore, in applying the corner fastener, the corner fastener is alined with the saw cut or kerf 7 with the head 2 at the inner end of the kerf 7 and the lip 4 in line with the kerf 11. Then, the corner fastener is driven into place as shown in Figure 1. In actual practice, I have found that such a corner fastener securely fastens two members together so that a rigid connection is provided.

In Figure 4, I have shown a modified form of fastening in which the plate 14 corresponds in all essentials to the plate 1 except that instead of providing the head 2, I bend back the inner edge of the plate to form a substantially semi-circular head 15 which may be driven into a circular opening 16 in the end of the kerf 7 of the member 6.

In Figure 5, a slightly modified form of fastening is provided wherein the plate 17 corresponds to plate 1 except that the head 18 is similar to the head 2 and a wooden pin 19 is driven into the hole 16 formed at the end of the kerf 7. If desired, the width of the plate can be slightly less than the members which are secured together so that when the corner fastening is in place, it will be within the upper and lower edges of the kerfs so that the exposed edges of the kerfs can be filled in to conceal the corner fastening.

From the foregoing it will be apparent that the hook-shaped end of the plate will rigidly hold the member 10 in intimate contact with the member 6 so that a rigid corner fastening is provided. I would have it understood that I do not wish to be limited to the use of this corner fastening with any particular article because, obviously, it can be used wherever the end of one member is to be fastened to the other in a rigid manner.

What I claim and desire to secure by Letters Patent is:—

1. In combination with two members to be secured together, one at right angles to the other, one of the members having a longitudinal saw cut between the side walls thereof and the other a transverse saw cut, a fastening plate having its main body in the longitudinal saw cut, the plate having a head embedded in the first member at the inner end of the saw cut within the perimeter of the member and a lip carried by and in spaced relation with the main body of the plate, engaging the transverse saw cut of the second member.

2. In combination, two members to be secured together at their ends, one at an angle to the other, one of the members having a longitudinal saw cut between the sides thereof and the other a transverse saw cut, a plate in the longitudinal saw cut having means within the perimeter of the member for preventing longitudinal movement in the saw cut and a lip integral with but in spaced relation to the main body of the plate, engaging the transverse saw cut of the second member.

3. In combination, two members to be secured together at their ends, one at an angle to the other, one of the members having a longitudinal saw cut between the sides thereof and the other a transverse saw cut, a plate in the longitudinal saw cut having means within the perimeter of the member for preventing longitudinal movement in the saw cut and a lip integral with but in spaced relation to the main body of the plate, engaging the transverse saw cut of the second member, the lip engaging the second member in its outer face to hold the side of the second member rigidly against the end of the first member.

4. In combination, two members to be secured together, one of the members having a longitudinal saw cut with a portion on one side of the saw cut extending beyond the portion on the other side of the saw cut, the second member bearing against the shorter portion of the first member and having a transverse saw cut on its outer face, a plate in the longitudinal saw cut having means engaging the first member to prevent longitudinal movement of the plate and a hook-shaped portion on the plate bearing against the second member and engaging the saw cut thereof to hold the two members together.

5. In combination, two wall members, one of which is provided with a longitudinal saw cut between the sides thereof, the inner portion of the member being cut transversely to the saw cut to provide an overlapping portion, the other member having its end received in the space provided by the cut-a-way portion and provided with a transverse saw cut extending partially into the body thereof, a plate in the longitudinal saw cut having a portion engaging the transverse saw cut and means at the end of the longitudinal saw cut to prevent longitudinal movement of the plate.

In testimony whereof I affix my signature.

WILLIAM E. WILLIAMS.